US009536186B2

(12) United States Patent
Nash et al.

(10) Patent No.: US 9,536,186 B2
(45) Date of Patent: Jan. 3, 2017

(54) CODED LIGHT PATTERN HAVING HERMITIAN SYMMETRY

(71) Applicant: QUALCOMM Incorporated, San Diego, CA (US)

(72) Inventors: James Wilson Nash, San Diego, CA (US); Kalin Mitkov Atanassov, San Diego, CA (US); Stephen Michael Verrall, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/536,402

(22) Filed: Nov. 7, 2014

(65) Prior Publication Data
US 2015/0371434 A1 Dec. 24, 2015

Related U.S. Application Data

(63) Continuation of application No. 14/491,521, filed on Sep. 19, 2014.

(60) Provisional application No. 62/015,349, filed on Jun. 20, 2014.

(51) Int. Cl.
| | |
|---|---|
| *G06K 19/06* | (2006.01) |
| *G06K 9/20* | (2006.01) |
| *G02B 27/42* | (2006.01) |
| *G02B 5/18* | (2006.01) |
| *G06T 15/50* | (2011.01) |

(52) U.S. Cl.
CPC ....... *G06K 19/06037* (2013.01); *G02B 5/1857* (2013.01); *G02B 27/4205* (2013.01); *G02B 27/4266* (2013.01); *G06K 9/2036* (2013.01); *G06T 15/506* (2013.01)

(58) Field of Classification Search
CPC ...... G06F 17/50; G06T 7/0057; G06T 15/506; G06K 19/06037; G06K 9/2036; G02B 5/1857; G02B 27/4205; G02B 27/4266
USPC .............................. 359/558–576; 250/237 R
See application file for complete search history.

(56) References Cited

U.S. PATENT DOCUMENTS

| | | | |
|---|---|---|---|
| 7,391,524 B1 | 6/2008 | Chen et al. | |
| 7,763,841 B1 * | 7/2010 | McEldowney | 250/216 |
| 8,142,023 B2 | 3/2012 | Lim | |
| 2002/0158210 A1* | 10/2002 | Suzuki | 250/455.11 |
| 2009/0194589 A1 | 8/2009 | Moon et al. | |
| 2013/0315501 A1 | 11/2013 | Atanassov et al. | |

(Continued)

OTHER PUBLICATIONS

Zhang et al. (Three-dimensional profilometry using a Dammann grating, Applied Optics vol. 48, No. 19, pp. 3709-3715 {Jul. 1, 2009}).*

(Continued)

*Primary Examiner* — Kimberly N Kakalec
(74) *Attorney, Agent, or Firm* — Toler Law Group, PC

(57) ABSTRACT

A method includes identifying one or more codewords of a bit sequence that fail to satisfy at least one codeword constraint. The method also includes removing the one or more codewords from the bit sequence to generate a punctured bit sequence. The method includes, in response to determining that the punctured bit sequence is symmetric, generating a hermitian symmetric codebook primitive based at least in part on the punctured bit sequence, where the hermitian symmetric codebook primitive is useable to form a diffractive optical element (DOE) of a structured light depth sensing system.

30 Claims, 14 Drawing Sheets

(56) References Cited

U.S. PATENT DOCUMENTS

2015/0371127 A1    12/2015   Nash et al.

OTHER PUBLICATIONS

Twardowski et al. (Three-dimensional shape measurement based on light patterns projection using diffractive optical elements, Proc. of SPE vol. 7716, 771621 {May 14, 2010}).*
Albitar, C. et al., "Fast 3D Vision with Robust Structured Light Coding," Proceedings of SPIE Medical Imaging 2009: Visualization, Image-Guided Procedures, and Modeling, 2009, vol. 7261, SPIE, Bellingham, Washington, pp. 726113-1-726113-8.
Allebach, J.P. et al., "Iterative Approaches to Computer Generated Holography," Proceedings of Computer-Generated Holography II, 1988, vol. 884, SPIE, Bellingham, Washington, pp. 2-9.
Hermerschmidt, A., "Introduction to Diffractive Optics," International Photonics Cluster Summer School, Aug. 2006, Holoeye Corporation, San Diego, CA, 28 pages.
Fernandez, S., et al., "Basic Concepts," Handbook of 3D Machines Vision, Optical Metrology and Imaging, Chapter 5, 2013, CRC Press, Boca Raton, FL, pp. 101-149.
International Search Report and Written Opinion for International Application No. PCT/US2015/033531, ISA/EPO, Date of Mailing Sep. 21, 2015, 18 pages.
Jahne, B., "Image Representation," Digital Image Processing, 5th Revised and Extended Edition, Chapter 2, 2002, Springer, Berlin, Germany, pp. 48-49.
Rosen, J., "Transformations in Space, Time, and Space-Time," Symmetry Rules, How Science and Nature are Founded on Symmetry, Chapter 10.3, 2008, Springer, Berlin, Germany, p. 237.

* cited by examiner

| Codebook Primitive 702 | Codebook Primitive 702 | Codebook Primitive 702 |
|---|---|---|
| Codebook Primitive 702 | Codebook Primitive (Hermitian Symmetric & Satisfying Codeword Constraint(s)) 702 • ← Origin Coordinate | Codebook Primitive 702 |
| Codebook Primitive 702 | Codebook Primitive 702 | Codebook Primitive 702 |

CODED LIGHT PATTERN HAVING HERMITIAN SYMMETRY

I. CROSS-REFERENCE TO RELATED APPLICATIONS

The present application claims priority from and is a continuation of pending U.S. Non-Provisional application Ser. No. 14/491,521 filed on Sep. 19, 2014, entitled "CODED LIGHT PATTERN HAVING HERMITIAN SYMMETRY," which claims priority from U.S. Provisional Application No. 62/015,349 filed on Jun. 20, 2014, entitled "CODED LIGHT PATTERN HAVING HERMITIAN SYMMETRY," the content of each of which is incorporated by reference herein in its entirety.

II. FIELD

The present disclosure is generally related to generation of a coded light pattern having hermitian symmetry.

III. DESCRIPTION OF RELATED ART

Advances in technology have resulted in smaller and more powerful electronic devices. For example, there currently exist a variety of mobile devices, such as wireless telephones, personal digital assistants (PDAs), and paging devices. A wireless device may be small, lightweight, and easily carried by users. Wireless telephones, such as cellular telephones and Internet Protocol (IP) telephones, can communicate voice and data packets over wireless networks. Also, wireless telephones can process executable instructions, including software applications, such as a web browser application, that can be used to access the Internet. Further, many wireless telephones include other types of devices that are incorporated therein. For example, a wireless telephone can also include a digital still camera, a digital video camera, a digital recorder, and an audio file player. As such, wireless telephones and other mobile devices can include significant computing capabilities.

Active sensing, also referred to as structured light depth sensing, is an application associated with electronic and mobile devices. In active sensing, a known optical pattern is illuminated or projected onto a scene. A receiver sensor may capture an image of the scene. The optical pattern in the captured image may differ from (e.g., be displaced relative to) the originally projected optical pattern. A difference between the optical pattern in the captured image and the originally projected optical pattern may be used to ascertain a depth of the objects in the scene. The depth information may be used, for instance, to reconstruct a three-dimensional (3D) representation of the scene and the objects therein.

Various characteristics of the optical pattern projected onto the scene may impact an accuracy of the active depth sensing and the 3D reconstruction. For example, certain patterns may cause "ghost images" that cause interference during the depth sensing process. As another example, certain patterns may create a large zero-order (i.e., undiffracted) beam, which may cause eye safety issues, such as in cases of a system that uses a laser as a light source. Further, complex patterns that provide adequate depth estimation resolution may be expensive to manufacture. For example, when a complex pattern is formed by an optical element within a structured light transmitter, the optical element of the transmitter may need to be manufactured using an expensive multi-stage, multi-mask photolithographic process.

IV. SUMMARY

The present disclosure describes generating and using an optical (e.g., coded light) pattern that has hermitian symmetry (alternately referred to as even symmetry). The use of a hermitian symmetric pattern may eliminate ghost images and may provide a smaller and lower-intensity zero-order beam as compared to an asymmetric pattern. The optical pattern may include a tessellated codebook primitive. The codebook primitive may be generated based on one or more codeword constraints, such as a size constraint, a minimum and/or average duty cycle constraint, a phase map constraint, etc. For example, an iterative method to generate the codebook primitive may include puncturing a randomly initialized bit sequence to remove codeword(s) that do not satisfy the codeword constraint(s). If a coded pattern generated from the punctured bit sequence has hermitian symmetry and satisfies a uniqueness criterion, the coded pattern may be used to generate the codebook primitive. If the coded pattern is not hermitian symmetric or does not satisfy the uniqueness criterion, a new bit sequence may be initialized and the method may be repeated.

The codebook primitive generated by the described techniques may be used to manufacture a diffractive optical element (DOE) using a single-mask photolithographic process. When used in a structured light system, the DOE may receive light from a light source (e.g., a laser) and may produce a hermitian symmetric optical pattern that includes tessellation of the codebook primitive. The hermitian symmetric optical pattern may be projected onto a scene (or object therein) and used to perform depth estimation.

In a particular embodiment, a method includes identifying one or more codewords of a bit sequence that fail to satisfy at least one codeword constraint and removing the one or more codewords from the bit sequence to generate a punctured bit sequence. The method further includes determining whether the punctured bit sequence is symmetric. In response to determining that the punctured bit sequence is symmetric, the method generates a hermitian symmetric codebook primitive based at least in part on the punctured bit sequence, where the hermitian symmetric codebook primitive is useable to form a diffractive optical element (DOE) of a structured light depth sensing system.

In another particular embodiment, a non-transitory computer-readable medium includes instructions that, when executed by a computer, cause the computer to perform operations that include identifying one or more codewords of a bit sequence that fail to satisfy at least one codeword constraint. The operations also include removing the one or more codewords from the bit sequence to generate a punctured bit sequence. The operations further include determining whether the punctured bit sequence is symmetric. The operations include, in response to determining that the punctured bit sequence is symmetric, generating a hermitian symmetric codebook primitive based at least in part on the punctured bit sequence, where the hermitian symmetric codebook primitive is useable to form a diffractive optical element (DOE) of a structured light depth sensing system.

In another particular embodiment, an apparatus includes a diffractive optical element (DOE) configured to generate an optical pattern. The optical pattern has hermitian symmetry and includes a tessellated codebook primitive generated to satisfy at least one codeword constraint.

In another particular embodiment, an apparatus includes means for emitting light, means for focusing the light, and means for diffracting the light to produce an optical pattern.

The optical pattern has hermitian symmetry and includes a tessellated codebook primitive generated to satisfy at least one codeword constraint.

One particular advantage provided by at least one of the disclosed embodiments is an ability to generate a hermitian symmetric optical pattern that provides improved performance in a structured light depth sensing system that generates a 3D depth map. Another particular advantage provided by at least one of the disclosed embodiments is a DOE that is inexpensive to manufacture and that the DOE can be incorporated in the structured light depth sensing system to generate and project the hermitian symmetric optical pattern.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 7 is a diagram to illustrate a particular embodiment of an optical pattern including a tessellated codebook primitive;

VI. DETAILED DESCRIPTION

Figure 1:
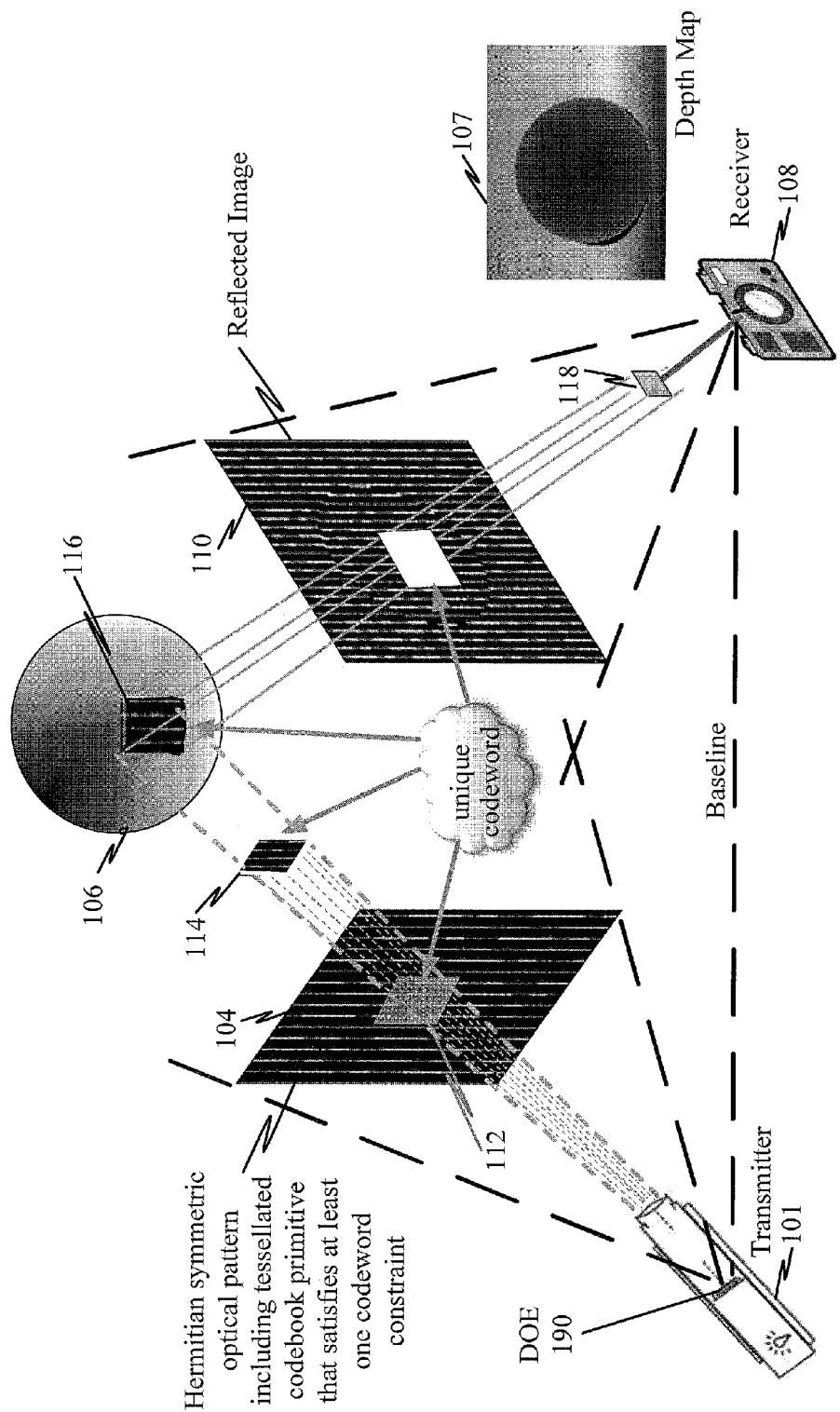
FIG. 1 is a diagram of a structured light depth sensing system including a diffractive optical element (DOE) that is configured to project a hermitian symmetric optical pattern including a tessellated codebook primitive that satisfies at least one codeword constraint.

FIG. 1 illustrates a particular embodiment of a structured light depth sensing system (alternately referred to herein as an active sensing system) in which a known pattern is used to illuminate a scene or object. The system may obtain depth information from the illuminated scene and may use the depth information to generate three-dimensional (3D) information from two-dimensional (2D) images and/or information. One or more aspects and/or features described herein may be implemented within such a system.

In the system of FIG. 1, a transmitter 101 projects an optical pattern 104 that includes one or more codewords onto a scene or object 106. Each codeword may correspond to a uniquely detectable part of the optical pattern. For example, each codeword may correspond to an arrangement of one or more dots, an arrangement of one or more lines, a grid arrangement, etc. The optical pattern 104 may correspond to an optical pattern generated by passing a light field through a diffractive optical element (DOE) 190. The DOE 190 may thus represent a "code mask" through which the light field is passed to generate the optical pattern 104. As further described herein, the optical pattern 104 generated by the DOE 190 may have hermitian symmetry and may include a tessellated codebook primitive that is generated (e.g., designed) to satisfy at least one codeword constraint. Hermitian symmetric optical patterns and DOEs configured to generate such patterns are further described with reference to FIGS. 5-13.

A receiver 108 captures a reflected optical pattern 110 and codewords therein. In the example of FIG. 1, a section/portion/window 112 of the optical pattern 104 is projected (as section/portion/window 114) onto a surface (e.g., projected section/portion/window 116) of a scene or object 106. The projected section/portion/window 116 may be captured by the receiver 108 as a captured segment 118. The section/portion/window 112 may be used as a codeword that can be uniquely identified. The reflected optical pattern 110 may differ from the initially projected optical pattern 104 based on characteristics (e.g., shape, depth, etc.) of the scene or object 106. Thus, by covering the scene or object 106 with unique codewords, sections/portions of the scene or object 106 may be identified/tagged, and such information may be used for depth sensing, as further described herein.

From the image captured by the receiver 108, multiple segments may be identified over the scene or object 106. Each segment, such as the segment 118, may be uniquely identifiable at the receiver 108, and the location of the segment 118 location relative to other segments may be ascertained from the optical pattern 104. The identification of a code (e.g., codeword) from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. As an illustrative non-limiting example, a difference in the location of a particular codeword in the projected optical pattern 104 as compared to the captured optical pattern 110 may be used to determine depth information of the object 106, as further described with reference to FIGS. 2-3. Multiple such segments/portions/windows may be combined to stitch together a captured image pattern. In this manner, 3D point cloud data and/or a depth map 107 may be generated for the scene or object 106. In the depth map 107, objects (or portions/surfaces thereof) determined to be the same distance away from the receiver 108 may be represented using the same color. The depth map 107 may be used for various applications, including but not limited to gaming, gesture control, room/space mapping, 3D printing, etc.

Figure 2:
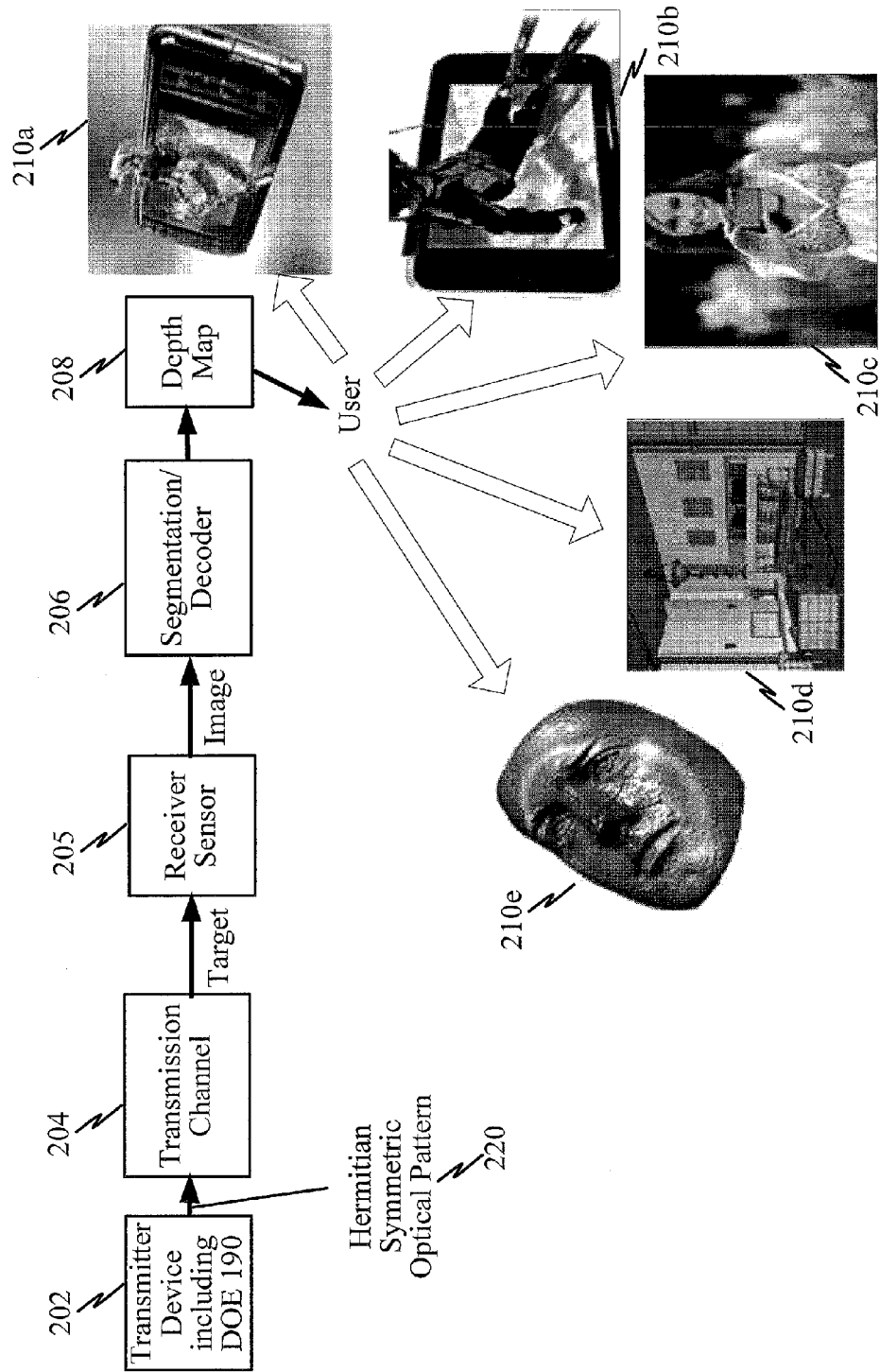
FIG. 2 is a diagram of a structured light depth sensing system including a transmitter device having the DOE of FIG. 1.

FIG. 2 illustrates another particular embodiment of a structured light depth sensing system. A transmitter device 202 may project a hermitian symmetric optical pattern 220 (e.g., based on projecting light through the DOE 190 of FIG. 1) over a transmission channel 204. For example, the hermitian symmetric optical pattern 220 may include or correspond to the hermitian symmetric optical pattern 104 of FIG. 1. The optical pattern may be projected onto a target (e.g., a scene or object) and the reflected light may be captured by a receiver sensor 205 as an image. At the receiver sensor 205 (e.g., the receiver 108 of FIG. 1), the target (e.g., the scene or object) may be captured and the shape/depth of the target may be encoded. Shape/depth encoding may be performed, for example, using a projected optical pattern to ascertain depth information. For example, the captured image of the scene or object, which includes (e.g., a displaced/modified version of) the projected optical pattern, may be segmented and/or decoded by a segmentation/decoder 206 to obtain depth data, such as a depth map 208. The depth map 208 may be used to present, generate, and/or provide a 3D version 210a, 210b, 210c, 210d, 210e of the target. One or more aspects or features described herein may be implemented within the exemplary environments of FIGS. 1 and 2.

Figure 3:
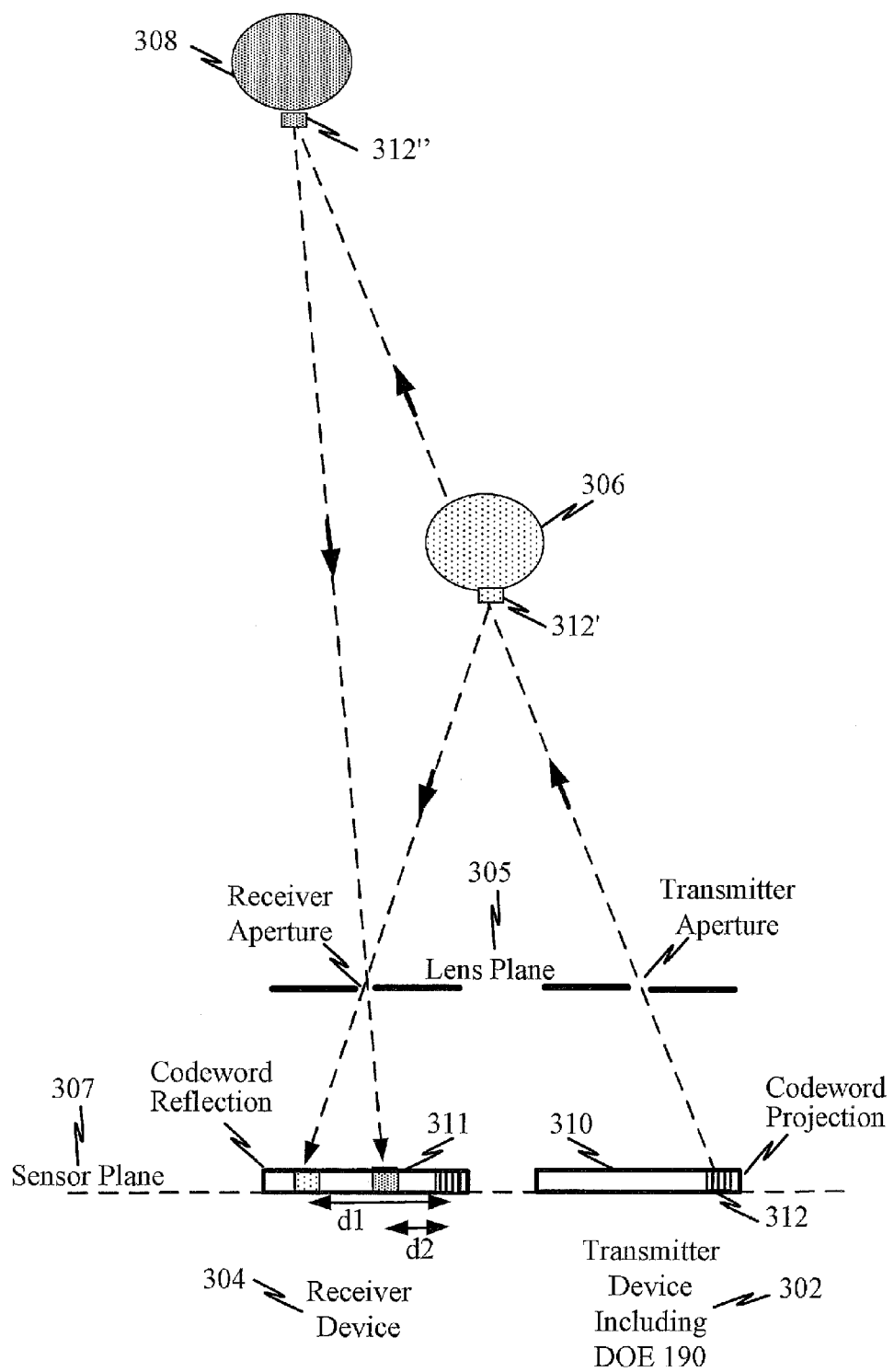
FIG. 3 is a diagram of a particular embodiment of determining depth information of an object based on a projected version of an optical pattern and a captured version of the optical pattern.

FIG. 3 illustrates a particular embodiment of a method of operation at a structured light depth sensing system, such as the system of FIG. 1 or the system of FIG. 2. As shown in FIG. 3, a transmitter device 302 may be on the same baseline reference plane (e.g., a lens plane 305) as a receiver device 304. For example, the transmitter device 302 may be the transmitter 101 that includes the DOE 190 of FIG. 1 or the transmitter device 202 of FIG. 2. Thus, the transmitter device 302 may project an optical pattern 310 onto a scene or object through an aperture or lens, where the optical pattern 310 is hermitian symmetric and includes a tessellated codebook primitive that satisfies at least one codeword constraint, as further described with reference to FIGS. 5-13.

For purposes of illustration, a segment/portion/window 312 (representing a codeword) is shown as part of the transmitted optical pattern 310. The segment/portion/window 312 may be projected onto a scene or object 306 at a first distance or onto another scene or object 308 at a second distance. The receiver device 304 may capture the projected optical pattern 310 (as a received optical pattern 311) through a receiver aperture, as shown. In the embodiment of FIG. 3, the transmitted optical pattern 310 is shown on the same sensor plane 307 as the received optical pattern 311.

When a scene or object 306 is located close to the transmitter device 302 (e.g., a first distance from the transmitter device) the projected segment 312 may appear at a distance d1 from its initial location. When the scene or object 308 is located further away (e.g., a second distance from the transmitter device), the projected segment/portion/window 312 may appear at a distance d2 from its initial location (where d2<d1). That is, the farther away an object is from the transmitter/receiver, the closer the received projected segment/portion/window is from its original position at the receiver device 304 (e.g., the outgoing projection and incoming projection are more parallel). Conversely, the closer an object is from the transmitter/receiver, the further the received projected segment/portion/window is from its original position at the receiver device 304.

Thus, a difference between received and transmitted codeword position may be used to determine a depth of a scene or object. In one example, such depth (e.g., relative depth) may provide a depth for each pixel or subset of grouped pixels (e.g., regions of two or more pixels).

Various types of modulation and coding schemes may be used to generate an optical pattern. For example, such modulation and coding schemes may include, but are not limited to, temporal coding, spatial coding, and direct codification. In temporal coding, patterns may be successively projected onto a measuring surface (e.g., over time). In spatial coding, information may be encoded in a local neighborhood based on shapes and patterns. Pseudorandom codes may be based on De Bruijn sequences. Alternatively, M-arrays may define a codebook (e.g., m-ary intensity or color modulation). In direct codification, both horizontal and vertical pixel coordinates may be encoded, and monotonic phase modulation or intensity waveform modulation may be used to generate the optical pattern.

Figure 4:
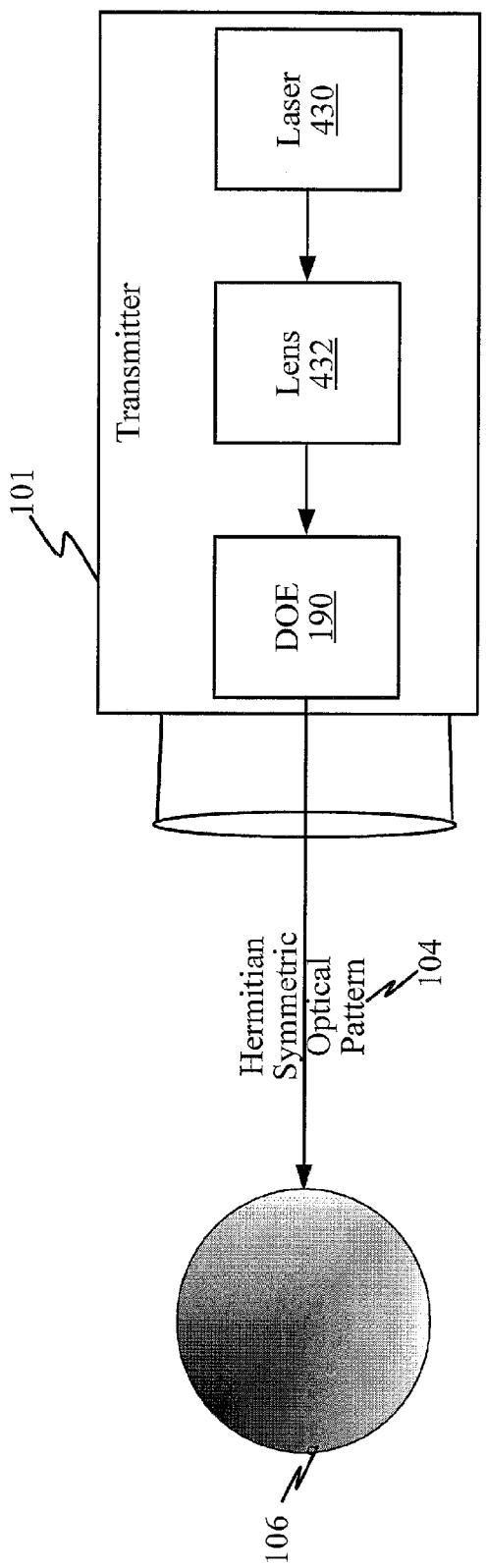
FIG. 4 is a diagram of a particular embodiment of a transmitter that includes the DOE of FIG. 1.

FIG. 4 illustrates a particular embodiment of the transmitter 101. As shown in FIG. 4, the transmitter 101 is a device configured to emit light, such as an illustrative laser 430 (e.g., a laser projector). The transmitter 101 may also include a device configured to focus the light, such as an illustrative lens 432 (e.g., a monochromatic filter). In a particular implementation, the lens 432 is a collimation lens. The transmitter 101 also includes the DOE 190 of FIG. 1. Although not shown in FIG. 4, the transmitter 101 may also include additional components, such as a power source, a base and/or heat sink for the laser 430, a lens mount for the lens 432, a field-programmable gate array (FPGA) configured to enable a user interface, a processor, a memory, a controller, etc. The transmitter 101 may be incorporated into a computing device or portion thereof, such as a standalone projector or projection system, as part of a mobile phone or tablet computer, etc.

In some implementations, the transmitter 101 may include multiple DOEs, such as a first DOE (e.g., the DOE 190) and a second DOE. The first DOE may be configured to generate a first optical pattern and the second DOE may be configured to generate a second optical pattern. The first optical pattern may be hermitian symmetric and/or may include a first tessellated codebook primitive generated to satisfy one or more first codeword constraints. Additionally or alternatively, the second optical pattern may be hermitian symmetric and/or may include a second tessellated codebook primitive generated to satisfy one or more second codeword constraints. The first optical pattern may be distinct from the second optical pattern.

A controller of the transmitter 101 may be configured to determine one or more parameters associated with one or more environmental and/or application conditions, such as a distance to an object, an amount of light, a resolution, a frame rate, an amount of available power, etc. Based on the one or more parameters, the controller may select one of the multiple DOEs to be used by the transmitter 101. In some implementations, the transmitter 101 may include components and/or circuitry to physically change a position of one or more DOEs such that a selected DOE is positioned to generate a corresponding optical pattern. In some implementations, the controller may be configured to receive an input, such as a user input via a user interface of the transmitter 101, that indicates a selection of a particular DOE of the multiple DOEs. Accordingly, the controller may select the particular DOE responsive to the input.

In a particular implementation, the controller includes a processor and a memory. The memory may include executable instructions that, when executed by the processor, cause the processor to determine one or more parameters associated with one or more environmental and/or application conditions. The instructions may further cause the processor to select one of the multiple DOEs based on the one or more parameters and to initiate the laser 430 to pass light through the selected DOE. Although the multiple DOEs are described as including two DOEs, in other implementations the multiple DOEs may include more than two DOEs, where each DOE of the multiple DOEs is associated with a different corresponding optical pattern.

During operation, the laser 430 may emit light that is focused by the lens 432 onto the DOE 190. The DOE 190 may be manufactured (e.g., via photolithographic etching) such that when the light passes through the DOE 190, the hermitian symmetric optical pattern 104 (or the hermitian symmetric optical pattern 220 of FIG. 2) is formed and projected onto the scene or object 106. When a receiver captures the scene or object 106 and the optical pattern projected thereon, the captured scene or object may be free of ghost images due to the hermitian symmetry of the optical pattern. Further, because the optical pattern is hermitian symmetric, a zero-order beam (e.g., laser light that passes through the DOE 190 un-diffracted) may be smaller and may have lower intensity as compared to a zero-order beam generated by a non-hermitian symmetric pattern, which may improve eye safety when the scene or object 106 corresponds to a person.

Figure 5:
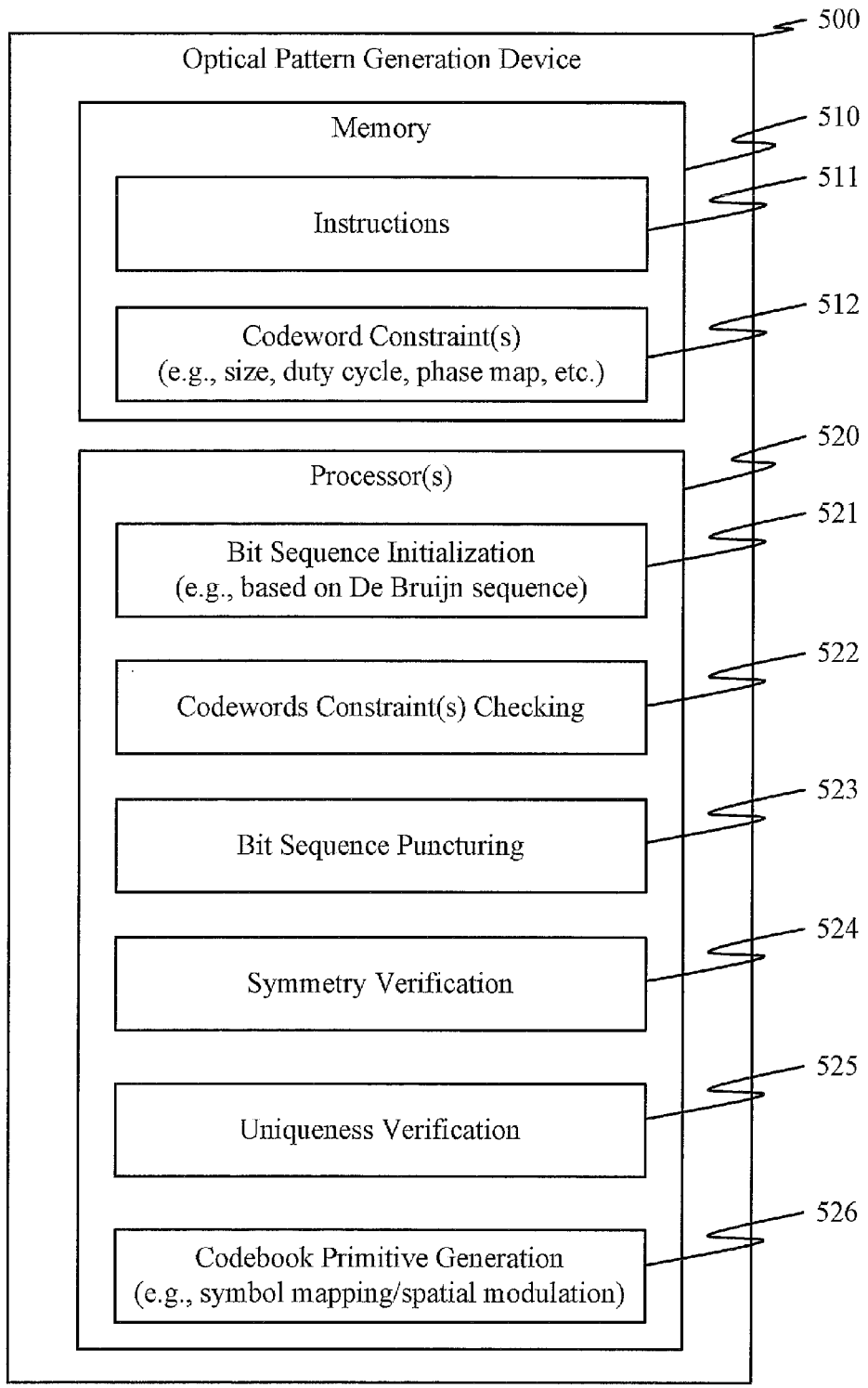
FIG. 5 is a diagram to illustrate a particular embodiment of a device configured to generate a hermitian symmetric codebook primitive that satisfies one or more codeword constraints.

FIG. 5 illustrates a particular embodiment of a device 500 configured to generate a hermitian symmetric codebook primitive that satisfies one or more codeword constraints. In a particular implementation, the device 500 corresponds to a fixed or portable computing device, such as a mobile phone, a tablet computer, a server, a desktop computer, a laptop computer, etc.

Figure 6:
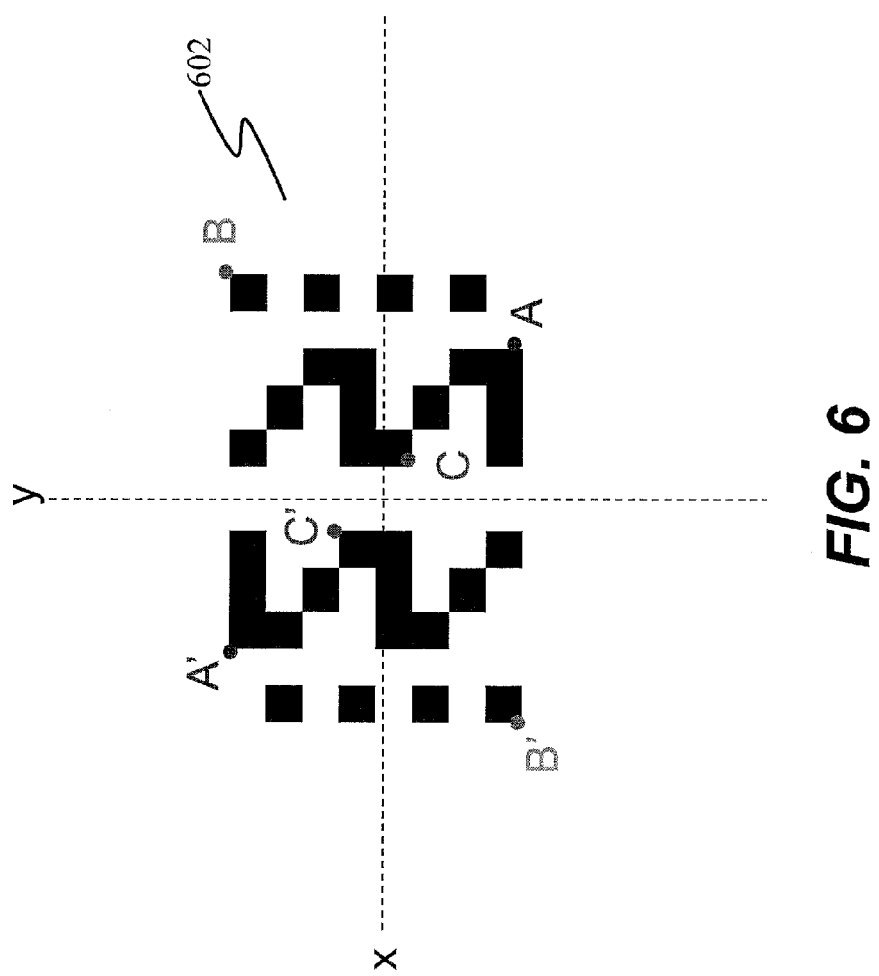
FIG. 6 is a diagram to illustrate a particular embodiment of a codebook primitive that is hermitian symmetric.

The device 500 includes a memory 510 and one or more processors 520. The memory 510 may store instructions 511 that are executable by the processor(s) 520 to generate a codebook primitive. The codebook primitive may be a 2D coded pattern that has hermitian symmetry. For example, FIG. 6 illustrates a particular embodiment of a codebook primitive 602 that is hermitian symmetric. A codebook primitive may have hermitian symmetry if and only if each point (x,y) of the codebook primitive is reflected about an origin (e.g., a point (0,0)) to a point (−x,−y) that is also in the codebook primitive. For purposes of illustration, three points A, B, and C of the codebook primitive 602 are shown in FIG. 6, along with X and Y axes that intersect at the origin. Corresponding reflected points A', B', and C' are also shown to illustrate hermitian symmetry.

A hermitian symmetric codebook primitive, such as the codebook primitive 602, may be automatically generated by the device 500 to satisfy one or more codeword constraints 512 stored in the memory 510. The one or more codeword constraints 512 may be pre-programmed and/or received or selected via user input. The one or more codeword constraints 512 may also be modified in response to user input or programmatically during operation of the device 500. The one or more codeword constraints 512 may be iteratively applied during generation and processing of a one-dimensional (1D) bit sequence. When a particular symmetric and unique bit sequence satisfying each of the one or more codeword constraints 512 is identified, the bit sequence may be used to generate a codebook primitive. Because the bit sequence is symmetric, the codebook primitive may be hermitian symmetric. In a particular implementation, the codebook primitive may be tessellated to form a larger 2D optical pattern, such as the optical pattern 104 of FIG. 1 or the optical pattern 220 of FIG. 2. FIG. 7 illustrates an example of such an optical pattern 700 that includes a tessellated codebook primitive 702, where the codebook primitive 702 is hermitian symmetric and satisfies codeword constraints. The optical pattern 700 may be generated by passing light through a DOE, such as the DOE 190 of FIG. 1. For example, the DOE may be manufactured such that when light passes through the DOE, the optical pattern 700 is generated by the DOE and projected onto a scene. To illustrate, different parts of the DOE may have different thickness. A focused light beam entering the DOE may be scattered by the DOE, and different parts of the light field output by the DOE may have different phases, which may be detected by a structured light receiver and demodulated to determine codewords, as described with reference to FIGS. 1-3. An illustrative embodiment of a method of manufacturing a DOE is further described with reference to FIG. 11.

When an optical pattern includes a tessellation of a codebook primitive, the optical pattern may be associated with a tessellation factor. The tessellation factor may correspond to the number of times the codebook primitive is tessellated (e.g., repeated) in the optical pattern. For example, the tessellation factor for the optical pattern 700 of FIG. 7 is nine.

Figure 8:
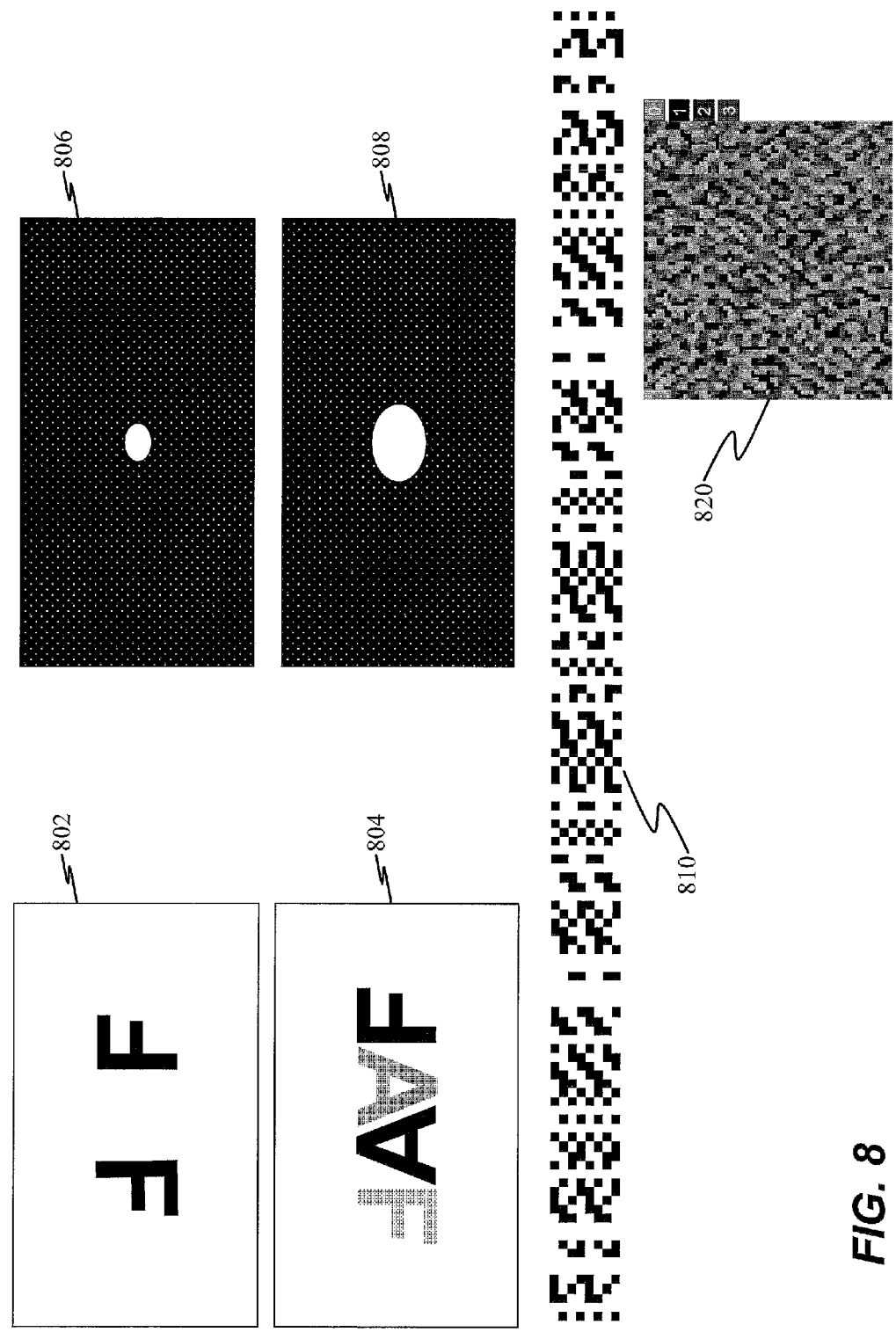
FIG. 8 is a diagram to illustrate an ability of a hermitian symmetric optical pattern to eliminate ghost images and reduce a size of a zero-order beam.

Using a hermitian symmetric codebook primitive (which is used to form a hermitian symmetric optical pattern) may provide several benefits as compared to using non-hermitian symmetric codebook primitives or patterns. FIG. 8 is a diagram that illustrates particular benefits of using a hermitian symmetric codebook primitive/pattern. As shown at 802, because a pattern has hermitian symmetry and is "flipped" along both X and Y axes, an interference-creating ghost image may be eliminated (e.g., may not be received by a receiver). In contrast, a non-hermitian symmetric pattern may cause ghost images, shown in gray at 804. Eliminating ghost images may simplify receiver-side signal processing. When an optical pattern used for depth sensing is hermitian symmetric, codeword recognition and demodulation accuracy may be increased, tolerance to moving objects (e.g., objects in motion) may be increased, tolerance to noise may be increased, tolerance to illumination changes in a scene may be increased, etc.

When light (e.g., laser light) is passed through a DOE, a portion of the light may pass through the center of the DOE un-diffracted, generating a zero-order beam. Because the zero-order beam is un-diffracted, the zero-order beam may have higher intensity than diffracted beams. The zero-order beam may result in a "blind spot" in the center of the optical pattern, because it may be difficult for a receiver to correctly recognize and demodulate codewords that are saturated by a higher-intensity zero-order beam. As shown at 806, a zero-order beam associated with the hermitian symmetric pattern may have reduced size as compared to a zero-order beam associated with a non-hermitian symmetric pattern, shown at 808. Thus, the hermitian symmetric pattern may provide a smaller "blind spot." The zero-order beam at 806 may also have lower intensity than the zero-order beam at 808. The smaller size and lower intensity of the zero-order beam at 806 may improve eye safety in a structured light depth sensing system, such as in cases where the light being used is laser light or another type of light that can harm an eye, such as a human eye.

FIG. 8 also illustrates an example of a hermitian symmetric codebook primitive 810. Notably, codebook primitives that are hermitian symmetric may be binary in nature. That is, the codewords in the codebook primitives may have binary values. When a codebook primitive is binary, an optical pattern generated by tessellating the codebook primitive is also binary. Further, a DOE manufactured to generate the optical pattern may be formed using a single-mask process, as further described with reference to FIG. 10. The single-mask process may be less expensive than a multi-mask process used to manufacture a DOE for a non-binary pattern. A phase space (e.g., Fourier domain) example of a non-binary pattern is shown at 820. In particular, the pattern 820 is a 4-phase pattern, where each shading color corresponds to a different phase. The four phases may correspond to the four different amounts that light passing through the pattern 820. Thus, in contrast to the 4-phase pattern 820, the hermitian symmetric codebook primitive 810 may be a 2-phase pattern.

Although hermitian symmetric codebook primitives may provide certain benefits, not all hermitian symmetric codebook primitives may be suitable for use in a structured light depth sensing system. For example, even though a codebook primitive is hermitian symmetric, the codebook primitive may be unsuitable if the codebook primitive has low energy, includes repeated codewords, etc. In accordance with the present disclosure, by application of the one or more codeword constraints 512 (e.g., by removing codewords that fail to satisfy the one or more codeword constraints 512) during generation of a hermitian symmetric codebook primitive, the generated codebook primitive may be well-suited for use in a structured light depth sensing system.

In some implementations, the one or more codeword constraints 512 may include a size constraint, alternatively referred to as a resolution constraint. To illustrate, the smaller a codeword, the smaller an object that can be detected by a structured light depth sensing system. For example, for the structured light depth sensing system to be able to detect and determine a depth difference between a button on a shirt and the shirt fabric, the codeword should be no larger than the size of the button. The one or more codeword constraints 512 may also include a codebook cardinality constraint corresponding to a number of unique codewords in a codebook primitive. For example, the number of unique codewords may be based on a camera resolution of a camera that is incorporated into a receiver device of the structured light depth sensing system.

In other implementations, the one or more codeword constraints 512 may include a spatial representation constraint. For example, the spatial representation constraint may indicate whether codewords in the codebook primitive should be represented using one or more dots, one or more lines, one or more grids, some other shape, or any combination thereof.

Figure 9:
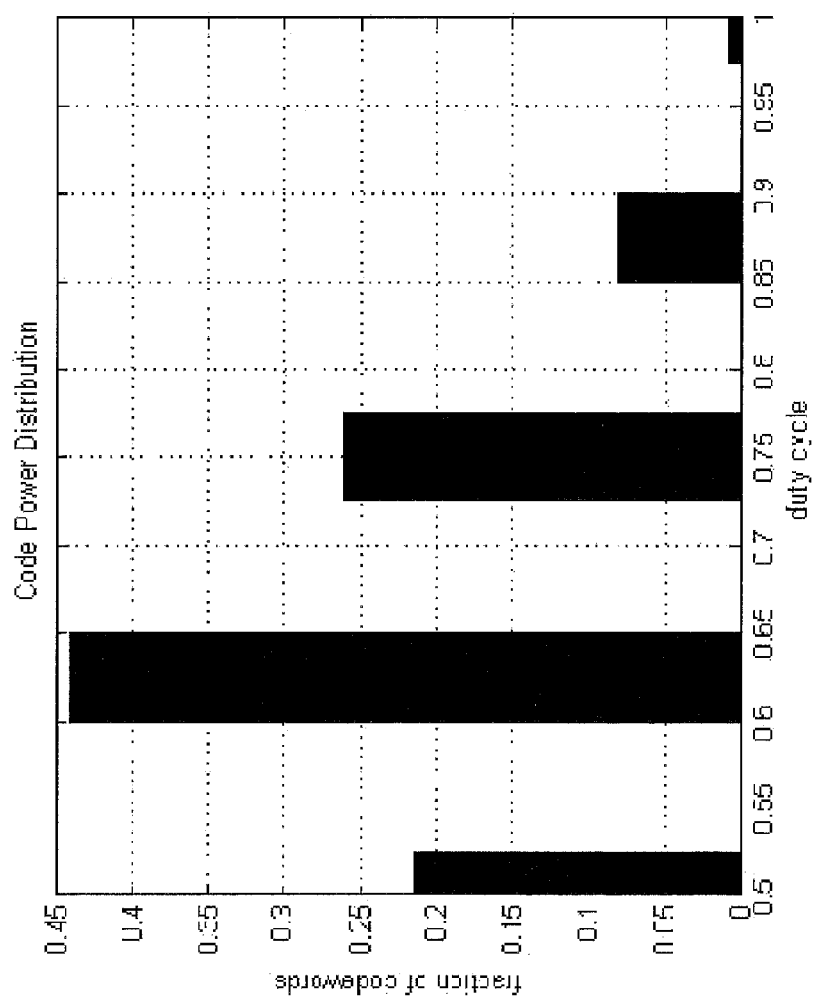
FIG. 9 is a diagram of an exemplary code power distribution associated with a hermitian symmetric codebook primitive.

The one or more codeword constraints 512 may also include one or more duty cycle constraints. The "duty cycle" of a codeword may correspond to a ratio of a number of asserted bits or portions (e.g., "1"s) to a number of un-asserted bits/portions (e.g., "0"s) in the codeword. When a coded light pattern including the codeword is projected onto a scene, each bit that has a value of "1" may have energy (e.g., light energy), whereas each bit having a value of "0" may be devoid of energy. The duty cycle of a codeword may thus represent an energy level of the codeword. For a codeword to be easily detectable, the codeword should have sufficient energy. Low energy codewords may be more difficult to detect and may be more susceptible to noise. For example, if a low-energy codeword includes one "1" and fifteen "0"s, a camera may not receive the light energy associated with the single "1" value and may thus fail to detect the codeword. Further, one or more of the fifteen "0" values may be erroneously interpreted as a "1" value due to noise. Thus, the one or more codeword constraints 512 may have a minimum duty cycle constraint corresponding to a minimum ratio of a number of bits in each of the plurality of codewords having a value of 1 to a number of bits in each of the plurality of codewords having a value of 0. Alternatively, or in addition, the one or more codeword constraints 512 may have an average duty cycle constraint corresponding to an average ratio of a number of bits in each of the plurality of codewords having a value of 1 to a number of bits in each of the plurality of codewords having a value of 0. An illustrative, non-limiting example of codeword power (e.g., energy) distribution is shown in FIG. 9. The distribution of FIG. 9 may correspond to a codebook primitive generated in accordance with particular minimum (or maximum) and/or average duty cycle constraints. In the example of FIG. 9, all codewords have a duty cycle of at least 50%, and nearly half of the codewords have a duty cycle of between 60%-65%.

In other implementations, the one or more codeword constraints 512 may include a contour resolution constraint that indicates that when a codeword is shifted by a small amount (e.g., a one-bit rotation), the resulting data represents another codeword. An amount that the codeword is shifted may be referred to as a shift amount. High contour resolution may enable the structured light depth sensing system to recognize relatively small object boundaries and provide recognition continuity for different objects (e.g., an ability to recognize and distinguish the button of a shirt from the shirt fabric).

In other implementations, the one or more codeword constraints 512 may include an aliasing distance constraint. The aliasing distant constraint may correspond to a distance between two codewords that are the same. When an optical pattern includes a tessellated codebook primitive and when each codeword in the codebook primitive is unique, the aliasing distance may be based on the size of the codebook primitive. The aliasing distance may thus represent a uniqueness criterion indicating that each codeword of the codebook primitive is to be different from each other codeword of the codebook primitive and that the codebook primitive is unique as a whole. Further, because the aliasing distance may be known to a receiver device, the receiver device may be able to prevent aliasing during codeword demodulation.

The one or more codeword constraints 512 may also include a spatial basis function constraint, alternately referred to as a phase shuffling constraint. To illustrate, when codewords are mapped to spatial symbols, the symbols may be randomly shifted. This added randomness may make it easier to demodulate a codeword that occurs on an object boundary, thereby improving depth map accuracy near the object boundary.

In another implementation, the one or more codeword constraints 512 may include a boundary constraint. For example, the boundary constraint may be satisfied when boundary regions of a codebook primitive include recognizable codewords, even when the codebook primitive is tessellated to form a larger optical pattern, such as the optical pattern 700 of FIG. 7.

During operation, the device 500 may generate a hermitian symmetric codebook primitive based on the one or more codeword constraints 512. In FIG. 5, the processor(s) 520 are illustrated as including a bit sequence initialization module 521, a codeword constraint(s) checking module 522, a bit sequence puncturing module 523, a symmetry verification module 524, a uniqueness verification module 525, and a codebook primitive generation module 526. Each of the modules 521-526 may correspond to hardware within the processor(s) 520 (e.g., a field programmable gate array (FPGA) device, an application-specific integrated circuit (ASIC), a controller, logic gates, etc.), software (e.g., the instructions 511) executed by the processor(s) 520, or a combination thereof. One or more of the modules 521-526 may be executed in any order and/or iteratively, as further described herein.

The bit sequence initialization module 521 may be configured to initialize a bit sequence from which the codebook primitive may be generated. For example, the bit sequence may be initialized based on a randomly seeded De Bruijn sequence. Alternatively, the bit sequence may be generated based on another mechanism. In a particular implementation, the bit sequence initialization module 521 may initialize the bit sequence such that the bit sequence satisfies at least some of the one or more codeword constraints 512.

Figure 10:
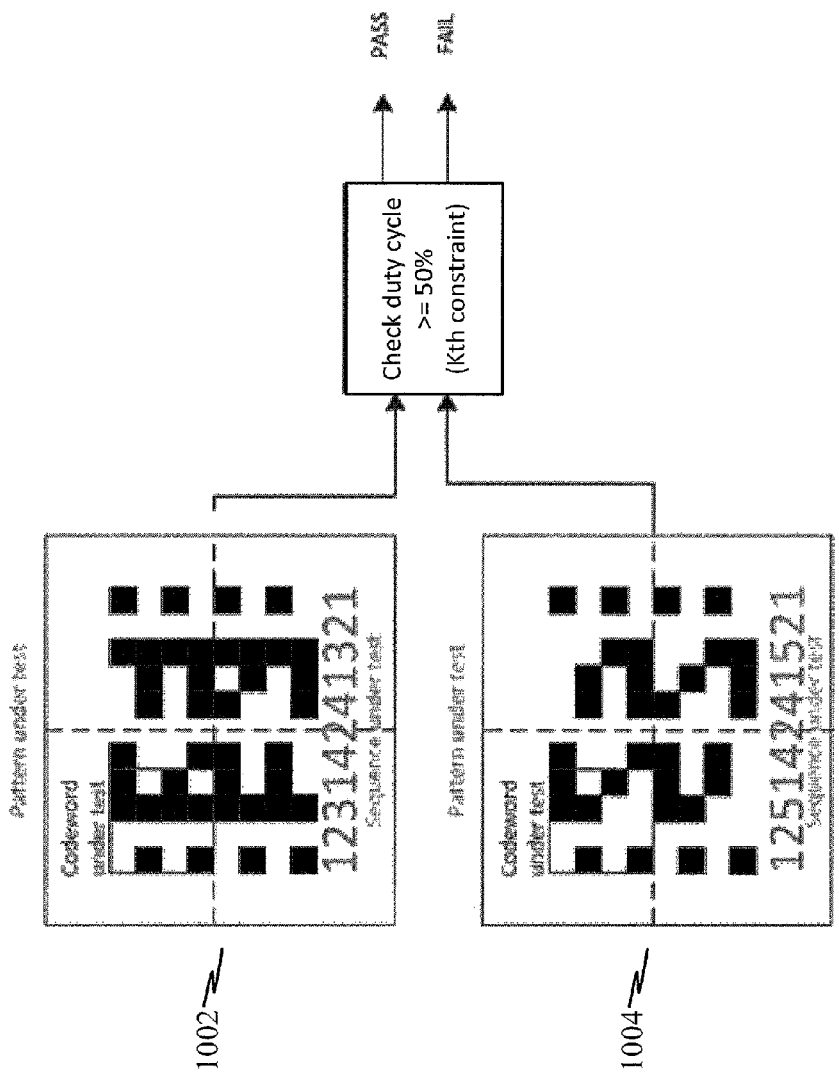
FIG. 10 is a diagram to illustrate a particular embodiment of a method of determining whether a codeword satisfies a codeword constraint.

The codeword constraints checking module 522 may be configured to identify one or more codewords of a bit sequence (e.g., the bit sequence initialized by the bit sequence initialization module 521) that fail to satisfy at least one of the one or more codeword constraints 512. The bit sequence puncturing module 523 may be configured to remove (e.g., "puncture") the one or more codewords identified by the constraints checking module 522 as failing to satisfy at least one of the one or more codeword constraints 512. As an example, FIG. 10 illustrates checking whether a "minimum duty cycle>=50%" constraint is satisfied. The "minimum duty cycle>=50%" constraint is the Kth constraint being tested (where K is an integer greater than or equal to 1). At 1002, testing of a first codeword of a first pattern associated with a first sequence "12314241321" is shown. The codeword is a 4×4 grid in which 8 of 16 bits (i.e., >=50% of the bits) are asserted, generating a "PASS" result for the minimum duty cycle constraint check. At 1004, testing of a second codeword of a second pattern associated with a second sequence "12514241521" is shown. The codeword is a 4×4 grid in which 6 of 16 bits (i.e., <50% of the bits) are asserted, generating a "FAIL" result for the minimum duty cycle constraint check.

The symmetry verification module 524 may be configured to determine whether a bit sequence (e.g., the punctured bit sequence generated by the bit sequence puncturing module 523) is symmetric. When a one-dimensional bit sequence is symmetric, a two-dimensional codebook primitive generated from the bit sequence may have hermitian symmetric. For example, the symmetry verification module 524 may "mirror" the bit sequence to generate a mirrored bit sequence and may determine that the bit sequence is symmetric when the bit sequence and the mirrored bit sequence are identical.

The uniqueness verification module 525 may be configured to determine whether a bit sequence (e.g., a bit sequence determined to be symmetric by the symmetry verification module 524) satisfies a uniqueness criterion. For example, uniqueness verification module 525 may determine whether each of the codewords included in the bit sequence is different from each other codeword included in the bit sequence, whether the bit sequence is unique as a whole, or a combination thereof. In a particular implementation, the uniqueness verification module 525 may also perform phase shuffling operations. However, because the phase shuffling operations may introduce or reintroduce codeword(s) that fail to satisfy one of the one or more codeword constraints 512, the phase shuffling operation may be followed by rechecking the bit sequence at the codeword constraints checking module 522.

The codebook primitive generation module 526 may generate a codebook primitive (e.g., the codebook primitive 602 of FIG. 6 or the codebook primitive 702 of FIG. 7) based on a particular bit sequence. For example, one or more of the modules 521-525 may be iteratively executed until a particular bit sequence is identified that is symmetric, satisfies each of the one or more codeword constraints 512, and satisfies the uniqueness criterion. In a particular implementation, the codebook primitive generation module 526 may generate a codebook primitive from the particular bit sequence by performing symbol mapping (e.g., to map each of the codewords in the bit sequence to a particular symbol) and/or spatial modulation (e.g., to map each of the symbols to a particular 2D pattern, such as a dot, a line, a grid, etc.).

The device 500 of FIG. 5 may thus be operable to automatically generate a hermitian symmetric codebook primitive that can be tessellated to form an optical pattern, such as an optical pattern to be produced by passing light through a DOE of a structured light depth sensing system. The optical pattern may be devoid of ghost images and may have a smaller and lower-intensity zero-order beam. Further, because the codebook primitive is generated to comply with one or more various codeword constraints, the optical pattern including the codebook primitive may enable simplified signal processing and improved performance at the structured light depth sensing system.

Figure 11:
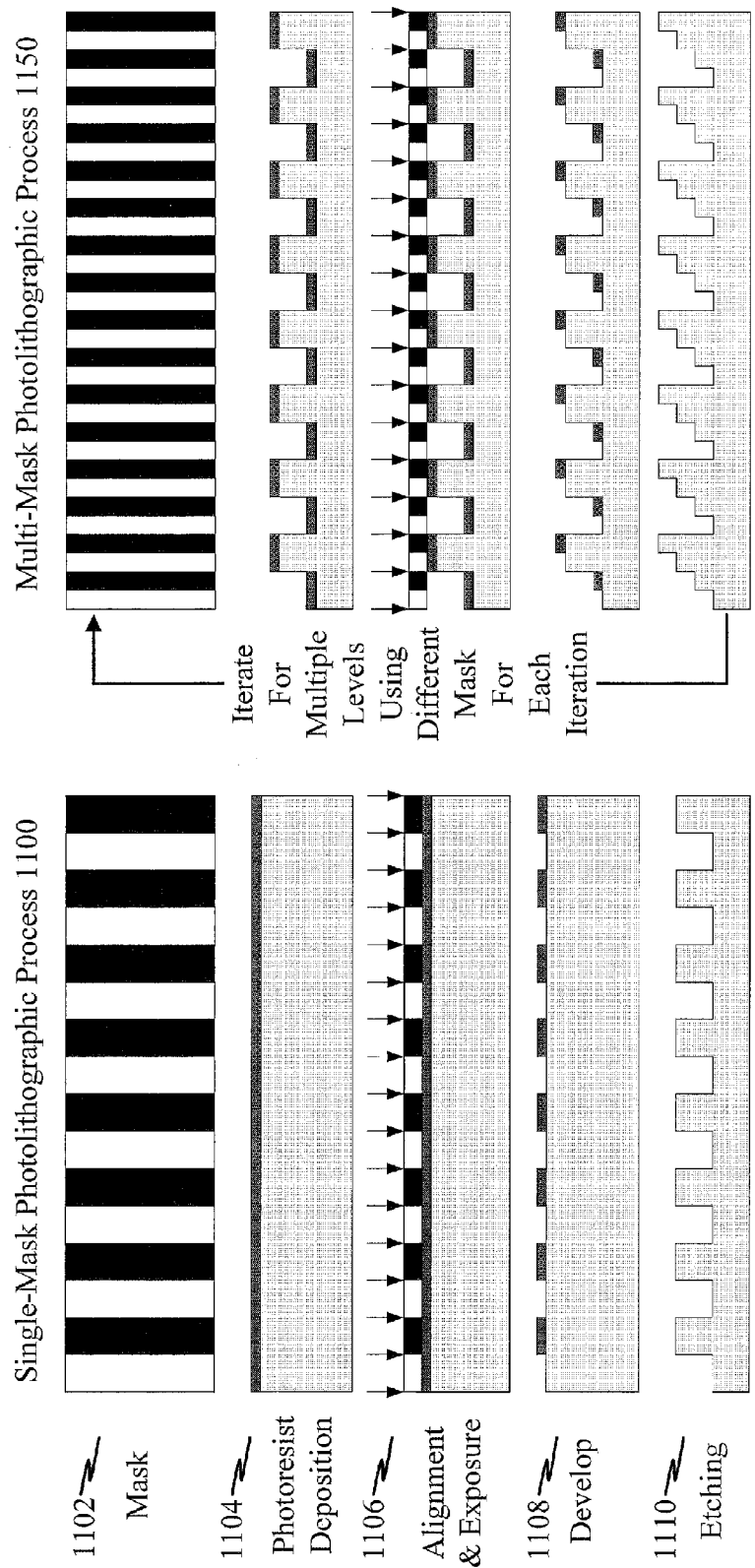
FIG. 11 is a diagram of a particular embodiment of a method of manufacturing the DOE of FIG. 1.

Use of the device 500 of FIG. 5 to generate a hermitian symmetric codebook primitive that satisfies one or more codeword constraints may also enable less expensive manufacturing of a DOE. For example, FIG. 11 is a diagram of an illustrative embodiment of a method of manufacturing a DOE, such as the DOE 190 of FIG. 1. As described herein, the DOE 190 is manufactured to generate an optical pattern that has hermitian symmetry, such as an optical pattern that includes a tessellated codebook primitive generated by the device 500 of FIG. 5.

The DOE 190 may be manufactured by a single-mask photolithographic process 1100. For comparative purposes, a multi-mask photolithographic process 1150 is also shown. The single-mask photolithographic process 1100 may include a photoresist deposition stage 1104, during which a light-sensitive material may be deposited onto a base layer corresponding to the DOE. For the multi-mask photolithographic process, the DOE may be formed of glass. In contrast, because the optical pattern is a binary pattern that involves a single etching stage, the DOE in the single-mask photolithographic process 1100 may be formed of glass or a material other than glass, such as a polymer or other light diffracting material that is less expensive than glass.

The single-mask photolithographic process 1100 may also include an alignment and exposure stage 1106. During the alignment and exposure stage 1106, a mask 1102 may be aligned with and placed (e.g., deposited) on the photoresist material. The mask and photoresist material may then be exposed to light (e.g., ultraviolet light). The mask 1102 may correspond to or may be generated based on the optical pattern to be produced by the DOE (e.g., the optical pattern that includes the hermitian symmetric codebook primitive that is generated by the device 500 of FIG. 5 and that satisfies the one or more codeword constraints 512).

The single-mask photolithographic process 1100 may further include a development stage 1108. During the development stage 1108, unmasked portions of the photoresist material may be removed, as shown. The single-mask photolithographic process 1100 may further include an etching stage 1110. During the etching stage 1110, exposed portions of the base may be removed (e.g., via electron beam (e-beam) etching). By etching different parts of the DOE to have different thickness (e.g., as determined by phase mapping), the index of refraction in the DOE may be varied to produce the optical pattern when light is passed through the DOE.

In contrast to the single-mask photolithographic process 1100, the multi-mask photolithographic process 1150 may iterate through the stages 1104-1110 multiple times, using a different mask 1102 for each stage. For example, to manufacture a DOE that can generate the 4-phase pattern 820 of FIG. 8, the stages 1104-1110 may be performed three or four times, with a different mask used for each iteration. Each additional mask may add manufacturing complexity and cost. For example, when multiple masks are used, each mask is aligned with high accuracy (e.g., on the order of a few nanometers (nm)), which may increase manufacturing cost and limit the types of materials that can be used to manufacture the DOE.

Thus, a DOE formed by the single-mask photolithographic process 1100, such as the DOE 190 of FIG. 1, may be less expensive to manufacture than a DOE formed by the multi-mask photolithographic process 1150.

Further, because the DOE 190 may be a relatively simple single-mask DOE corresponding to a binary optical pattern, performance of the DOE 190 may be accurately simulated by a computer. Thus, the DOE 190 may be simulated, tested, and/or verified prior to being manufactured. Computer-based testing and verification may be faster and less expensive than having to manufacture a new DOE after each testing iteration, such as may be required for a more complex DOE. When DOE testing is complete, data corresponding to the codebook primitive, the optical pattern that includes the codebook primitive, and/or the mask 1102 may be provided to a fabrication system, which may rapidly "stamp out" polymer DOEs using the single-mask photolithographic process 1100.

To illustrate, in some embodiments, a computer system, such as the device 500 of FIG. 5, may be configured to test and/or verify a new DOE. The computer system may include a processor and a memory coupled to the processor. For example, the processor and the memory may include or correspond to the one or more processors 520 and the memory 510 of FIG. 5, respectively. The memory may include executable instructions that, when executed by the processor, cause the processor to perform one or more operations.

When the computer system includes or corresponds to the device 500 of FIG. 5, the instructions may cause the processor to generate a data file that defines the hermitian symmetric codebook primitive and to store the data file at a particular memory associated with the computing device. The particular memory may be the same memory that stores the instructions or a different memory. In other implementations, the computer system may be distinct from the device 500 of FIG. 5 and the instructions may cause the processor to access the data file that defines the hermitian symmetric codebook primitive and to perform a simulation using the data file that defines the hermitian symmetric codebook primitive. For example, the computer system may access the data file from a memory associated with the device 500 of FIG. 5. Additionally, regardless of whether the computer system corresponds to the device 500 or is distinct from the device 500, the instructions may further cause the processor to validate the hermitian symmetric codebook primitive based on a result of the simulation. For example, the processor may initiate presentation of an indication, such as a message via a user interface, that indicates whether the hermitian symmetric codebook primitive passed the simulation.

In addition, because the DOE 190 may be power efficient (e.g., due to a smaller zero-order beam) and inexpensive to manufacture, the DOE 190 may be well-suited for incorporation into a mobile device, such as a wireless phone or tablet computer. The ability to quickly and inexpensively manufacture DOEs may also provide additional benefits. For example, a structured light depth sensing system may be configured to dynamically select one of multiple available DOEs based on environmental and/or application conditions. Different DOEs may be selected and used at different times. For example, a DOE producing a higher-resolution pattern may be used for close-range depth sensing and a DOE producing a lower-resolution pattern may be used for depth sensing of objects farther away. To illustrate, as described with reference to FIG. 4, the transmitter 101 may include multiple DOEs and circuitry configured to select a particular DOE of the multiple DOEs.

It should be noted that although various embodiments may be described herein as generating a visible optical pattern, this is not to be considered limiting. In alternate embodiments, optical patterns that are invisible to the human eye may be used for structured light applications. For example, an infrared optical pattern may be used.

Figure 12:
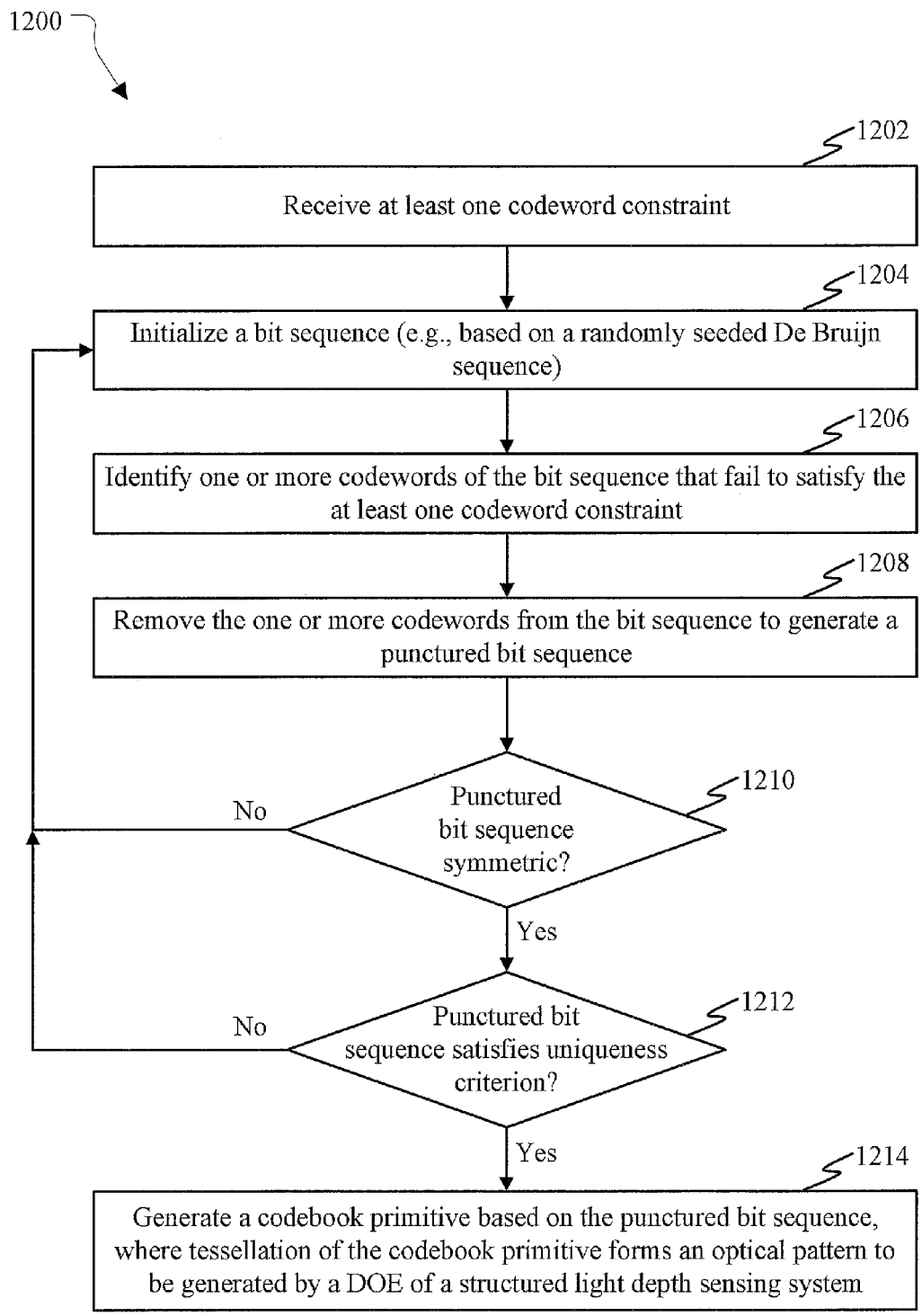
FIG. 12 is a flowchart of a particular embodiment of a method of operation at the device of FIG. 5.

FIG. 12 is a flowchart of a particular embodiment of a method 1200 of operation at the device 500 of FIG. 5. The method 1200 includes receiving at least one codeword constraint, at 1202. For example, in FIG. 5, the device 500 may receive the one or more codeword constraints 512. The method 1200 also includes initializing a bit sequence, at 1204. The bit sequence may be initialized based on a randomly seeded De Bruijn sequence. For example, in FIG. 5, the bit sequence initialization module 521 may initialize a bit sequence.

The method 1200 further includes identifying one or more codewords of the bit sequence that fail to satisfy the at least one codeword constraint, at 1206. For example, in FIG. 5, the codeword constraints checking module 522 may identify one or more codewords that fail to satisfy at least one of the one or more codeword constraints 512. The method 1200 includes removing the one or more codewords from the bit sequence to generate a punctured bit sequence, at 1208. For example, in FIG. 5, the bit sequence puncturing module 523 may remove the one or more codewords from the bit sequence to generate the punctured bit sequence.

The method 1200 also includes determining whether the punctured bit sequence is symmetric, at 1210. For example, in FIG. 5, the symmetry verification module 524 may verify whether the punctured bit sequence is symmetric. When the punctured bit sequence is not symmetric, the method 1200 may return to 1204 and a new bit sequence may be initialized. When the punctured bit sequence is symmetric, the method 1210 includes determining whether the punctured bit sequence satisfies a uniqueness criterion, at 1212. For example, in FIG. 5, the uniqueness verification module 525 may verify uniqueness of the punctured bit sequence and/or codewords included therein. The uniqueness verification module 525 may also perform phase shuffling operations, as described with reference to FIG. 5.

When the punctured bit sequence does not satisfy the uniqueness criterion, the method 1200 may return to 1204 and a new bit sequence may be initialized. When the punctured bit sequence satisfies the uniqueness criterion, the method 1200 includes generating a codebook primitive based on the punctured bit sequence, at 1214. For example, in FIG. 5, the codebook primitive generation module 526 may generate the codebook primitive via symbol mapping and/or spatial modulation. Tessellation of the codebook primitive forms an optical pattern to be generated by a DOE of a structured light depth sensing system. In an illustrative implementation, the DOE is the DOE 190 of FIG. 1 and is manufactured in accordance with the single-mask photolithographic process 1100 of FIG. 11.

It should be noted that in alternate implementations, one or more of the steps of the method 1200 may be performed in a different order and/or may be performed multiple times. As an illustrative non-limiting example, codeword constraint checking may be performed multiple times, such as after bit sequence initialization and after verifying uniqueness. Alternate methods of generating a codebook primitive may also be used. For example, FIG. 13 illustrates an alternate embodiment of a method of generating a coded pattern (e.g., codebook primitive) that has hermitian symmetry and that satisfies one or more codeword constraints, as is generally designated 1300.

Figure 13:
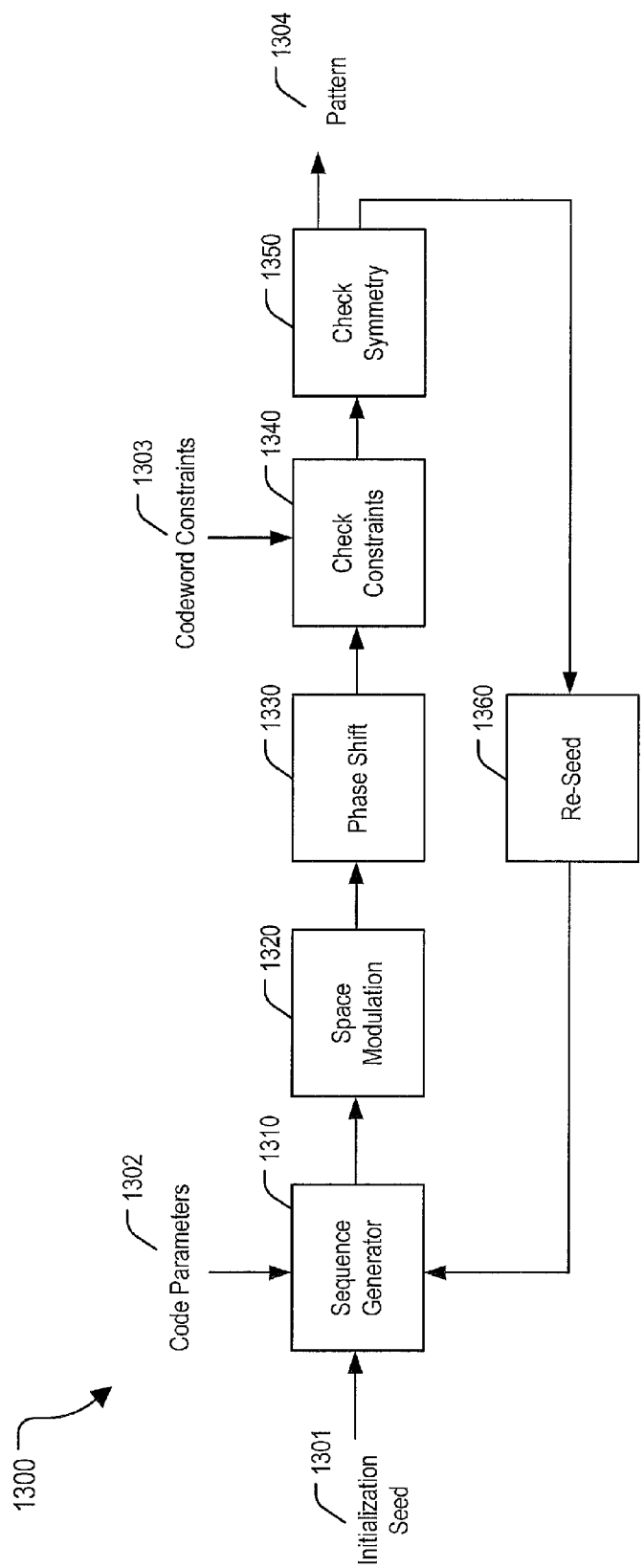
FIG. 13 is a diagram to illustrate an alternate embodiment of a method of generating a codebook primitive that has hermitian symmetry and that satisfies one or more codeword constraints.

As shown in FIG. 13, a sequence generator 1310 may receive an initialization seed 1301 and one or more code parameters 1302. In some implementations, the one or more code parameters may correspond to a subset of the codeword constraints 512 that can be used during bit sequence generation. For example, codeword size may be a parameter that is used to determine how long of a bit sequence to generate. The generated bit sequence may be space modulated, at 1320, and phase shifted, at 1330. The space modulated and phase shifted bit sequence may be examined, at 1340, to verify whether one or more codeword constraints 1303 are satisfied. For example, the one or more codeword constraints 1303 may correspond to the one or more codeword constraints 512 that are not included in the one or more code parameters 1302. At 1350, symmetry of the bit sequence (or a 2D pattern generated therefrom) may be verified. If the codeword constraints 1303 and the symmetry requirement are satisfied, an output pattern 1304 may be generated. If at least one of the codeword constraints 1303 or the symmetry requirement is unsatisfied, a new seed value may be generated, at 1360, and used to generate a new bit sequence.

Various methods described herein, including but not limited to the methods of FIGS. 10-13, may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof. As an example, such methods can be performed by one or more processors that execute instructions to automatically generate a hermitian symmetric codebook primitive that satisfies codeword constraints, manufacture a DOE that is configured to diffract light to produce an optical pattern that includes the hermitian symmetric codebook primitive, etc.

Figure 14:
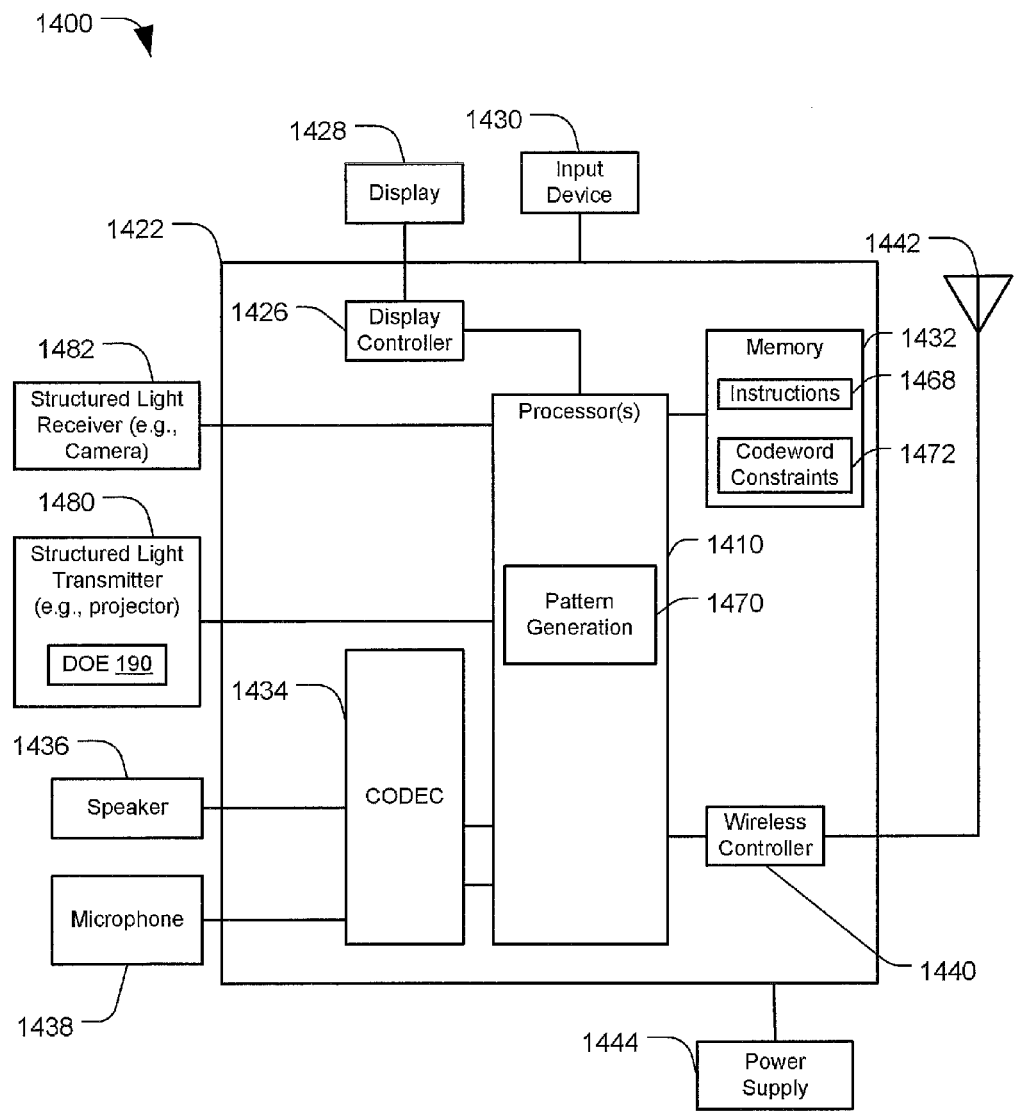
FIG. 14 is a diagram to illustrate a particular embodiment of an electronic device configured to support one or more systems or methods described with reference to FIGS. 1-13.

Referring to FIG. 14, a block diagram of a particular illustrative embodiment of a wireless communication device 1400 is depicted. The device 1400 may include one or more components of the structured light system of FIG. 1, the structured light system of FIG. 2, the structured light system of FIG. 3, the device 500 of FIG. 5, or any combination thereof.

The device 1400 includes one or more processors 1410 (e.g., one or more processing cores), such as a digital signal processor (DSP), a graphical processor unit (GPU), and/or a central processing unit (CPU). For example, the one or more processors 1410 may include or correspond to the one or more processors 520 of FIG. 5. The one or more processors 1410 may be coupled to a memory 1432. For example, the memory 1432 may include or correspond to the memory 510 of FIG. 5. The memory 1432 includes instructions 1468 (e.g., executable instructions), such as computer-readable instructions or processor-readable instructions. The instructions 1468 may include one or more instructions that are executable by a computer, such as by each of the one or more processors 1410. It should be noted that the memory 1432 includes a physical device and is not a signal.

For example, the one or more instructions may be executable by the one or more processors 1410 to cause the one or more processors 1410 to perform all or a portion of the method of FIG. 12, the method of FIG. 13, or a combination thereof. For example, the memory 1432 may include instructions that, when executed by the processor(s) 1410, cause the processor to perform operations including identifying one or more codewords of a bit sequence that fail to satisfy at least one codeword constraint. The operations may further include removing the one or more codewords from the bit sequence to generate a punctured bit sequence and determining whether the punctured bit sequence is symmetric. In response to determining that the punctured bit sequence is symmetric, the operations may also include generating a hermitian symmetric codebook primitive based at least in part on the punctured bit sequence. The hermitian symmetric codebook primitive may be useable to form a diffractive optical element (DOE) of a structured light depth sensing system.

The memory 1432 may also store codeword constraints 1472 (e.g., the one or more codeword constraints 512 of FIG. 5, the one or more code parameters 1302, and/or the one or more codeword constraints 1303 of FIG. 13). In FIG. 14, the processor(s) 1410 include a pattern generation module 1470. The pattern generation module 1470 may be configured to automatically generate a hermitian symmetric codebook primitive that satisfies the codeword constraints 1472. For example, the pattern generation module 1470 may include or correspond to the bit sequence initialization module 521, the codeword constraint(s) checking module 522, the bit sequence puncturing module 523, the symmetry verification module 524, the uniqueness verification module 525, the codebook primitive generation module 526, or a combination thereof, as illustrative, non-limiting examples.

FIG. 14 also shows a display controller 1426 that is coupled to the one or more processors 1410 and to a display 1428. A coder/decoder (CODEC) 1434 can also be coupled to the one or more processors 1410. A speaker 1436 and a microphone 1438 can be coupled to the CODEC 1434. The one or more processors 1410 may also be coupled to a structured light transmitter 1480 (e.g., a projector) and a structured light receiver 1482 (e.g., a camera). For example, the structured light transmitter 1480 may include or correspond to the transmitter 1010 of FIG. 1 or the transmitter 202 of FIG. 2. The receiver 1482 may include or correspond to the receiver 108 of FIG. 1. The structured light transmitter 1480 may include the DOD 190 of FIG. 1. Thus, in a particular implementation, both transmitter-side and receiver-side operations of a structured light depth sensing systems may be incorporated into a single device.

FIG. 14 also indicates that a wireless interface 1440, such as a wireless controller, can be coupled to the one or more processors 1410 and to an antenna 1442. In a particular implementation, the one or more processors 1410, the display controller 1426, the memory 1432, the CODEC 1434, and the wireless interface 1440 are included in a system-in-package or system-on-chip device 1422. In a particular implementation, an input device 1430 and a power supply 1444 are coupled to the system-on-chip device 1422. Moreover, in some implementations, the display 1428, the input device 1430, the speaker 1436, the microphone 1438, the antenna 1442, the structured light transmitter 1480, the structured light receiver 1482, and/or the power supply 1444 can be external to the system-on-chip device 1422. However, each of the display 1428, the input device 1430, the speaker 1436, the microphone 1438, the antenna 1442, the structured light transmitter 1480, the structured light receiver 1482, and/or the power supply 1444 can be coupled to a component of the system-on-chip device 1422, such as an interface, a controller, a transmitter (e.g., transmitter circuitry), a receiver (e.g., receiver circuitry), etc.

One or more of the disclosed embodiments may be implemented in a system or an apparatus, such as the device 1400, that may include a communications device, a fixed location data unit, a mobile location data unit, a mobile phone, a cellular phone, a satellite phone, a computer, a tablet, a portable computer, or a desktop computer. Alternatively or additionally, the device 1400 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Embodiments of the disclosure may be suitably employed in any device that includes integrated circuitry including memory, a processor, and on-chip circuitry. Although one or more of FIGS. 1-14 may illustrate systems, apparatuses, and/or methods according to the teachings of the disclosure, the disclosure is not limited to these illustrated systems, apparatuses, and/or methods. One or more functions or components of any of FIGS. 1-14 as illustrated or described herein may be combined with one or more other portions of another of FIGS. 1-14. Accordingly, no single embodiment described herein should be construed as limiting and embodiments of the disclosure may be suitably combined without departing form the teachings of the disclosure.

In conjunction with the described embodiments, an apparatus is disclosed that includes means for emitting light. For example, the means for emitting may include a light source included in or coupled to the transmitter 101, a light source included in or coupled to the transmitter 202, a light source included in or coupled to the transmitter device 302, the laser 430, an infrared light source, one or more other structures, devices, or circuits configured to emit light, or any combination thereof.

The apparatus may also include means for focusing the light. For example, the means for focusing the light may include a lens included in or coupled to the transmitter 101, a lens included in or coupled to the transmitter 202, a lens included in or coupled to the transmitter device 302, the lens 432, a collimation lens, one or more other structures, devices, or circuits configured to focus light, or any combination thereof.

The apparatus may further include means for diffracting the light to produce an optical pattern. The optical pattern has hermitian symmetry and includes a tessellated codebook primitive generated to satisfy at least one codeword constraint. For example, the means for diffracting may include an optical element included in or coupled to the transmitter 101, an optical element included in or coupled to the transmitter 202, an optical element included in or coupled to the transmitter device 302, the DOE 190, one or more other structures, devices, or circuits configured to diffract light to produce a hermitian symmetric optical pattern including a tessellated codebook primitive generated to satisfy at least one codeword constraint, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:
1. A method comprising:
 identifying, at a computing device comprising a processor, one or more codewords of a bit sequence that fail to satisfy at least one codeword constraint;
 removing the one or more codewords from the bit sequence to generate a punctured bit sequence; and
 in response to determining that the punctured bit sequence is symmetric, generating a hermitian symmetric codebook primitive based at least in part on the punctured bit sequence, wherein the hermitian symmetric code- book primitive is useable to form a diffractive optical element (DOE) of a structured light depth sensing system.

2. The method of claim 1, wherein the hermitian symmetric codebook primitive comprises a two-dimensional (2D) coded pattern.

3. The method of claim 2, wherein each point (x,y) of the 2D coded pattern is reflected about an origin of the 2D coded pattern to a point (−x,−y) of the 2D coded pattern.

4. The method of claim 2, wherein the 2D coded pattern comprises a plurality of codewords.

5. The method of claim 4, wherein the at least one codeword constraint comprises an average duty cycle constraint corresponding to an average ratio of a number of bits in each of the plurality of codewords having a value of 1 to a number of bits in each of the plurality of codewords having a value of 0.

6. The method of claim 4, wherein the at least one codeword constraint comprises a minimum duty cycle constraint corresponding to a minimum ratio of a number of bits in each of the plurality of codewords having a value of 1 to a number of bits in each of the plurality of codewords having a value of 0.

7. The method of claim 1, wherein the at least one codeword constraint comprises a size constraint.

8. The method of claim 1, wherein the at least one codeword constraint comprises a codebook cardinality constraint, a spatial representation constraint, a contour resolution constraint, an aliasing distance constraint, a phase shuffling constraint, a boundary constraint, or any combination thereof.

9. The method of claim 1, further comprising iteratively initializing bit sequences, puncturing the bit sequences, and verifying symmetry until a particular bit sequence is identified that is symmetric and that satisfies the at least one codeword constraint and a uniqueness criterion.

10. The method of claim 9, further comprising generating the hermitian symmetric codebook primitive based on the particular bit sequence.

11. The method of claim 1, wherein tessellation of the hermitian symmetric codebook primitive forms an optical pattern to be generated by the DOE of the structured light depth sensing system.

12. The method of claim 11, wherein the optical pattern is hermitian symmetric.

13. The method of claim 1, wherein the DOE is manufactured using a single-mask photolithographic process.

14. The method of claim 1, further comprising:
generating a data file that defines the hermitian symmetric codebook primitive; and
storing the data file at a memory associated with the computing device.

15. The method of claim 14, further comprising:
performing a simulation using the data file that defines the hermitian symmetric codebook primitive; and
validating the hermitian symmetric codebook primitive based on a result of the simulation.

16. A non-transitory computer-readable medium comprising instructions that, when executed by a computer, cause the computer to perform operations comprising:
identifying one or more codewords of a bit sequence that fail to satisfy at least one codeword constraint;
removing the one or more codewords from the bit sequence to generate a punctured bit sequence; and
in response to determining that the punctured bit sequence is symmetric, generating a hermitian symmetric codebook primitive based at least in part on the punctured bit sequence, wherein the hermitian symmetric codebook primitive is useable to form a diffractive optical element (DOE) of a structured light depth sensing system.

17. The non-transitory computer-readable medium of claim 16, wherein the at least one codeword constraint comprises a size constraint, an average duty cycle constraint, a minimum duty cycle constraint, a codebook cardinality constraint, a spatial representation constraint, a contour resolution constraint, an aliasing distance constraint, a phase shuffling constraint, a boundary constraint, or any combination thereof.

18. The non-transitory computer-readable medium of claim 16, wherein the at least one codeword constraint comprises one or more duty cycle constraints, wherein the one or more duty cycle constraints comprise an average duty cycle constraint, a minimum duty cycle constraint, a maximum duty cycle constraint, or a combination thereof.

19. The non-transitory computer-readable medium of claim 16, wherein the at least one codeword constraint comprises a codebook cardinality constraint, wherein the codebook cardinality constraint corresponds to a number of unique codewords in the hermitian symmetric codebook primitive.

20. The non-transitory computer-readable medium of claim 16, wherein the at least one codeword constraint comprises a spatial representation constraint, wherein the spatial representation constraint indicates that the hermitian symmetric codebook primitive is to be represented using one or more dots, one or more lines, one or more grids, or a combination thereof.

21. The non-transitory computer-readable medium of claim 16, wherein the at least one codeword constraint comprises a contour resolution constraint, wherein the contour resolution constraint indicates a shift amount associated with a codeword of the hermitian symmetric codebook primitive, wherein, when the codeword is shifted by the shift amount, the codeword represents another codeword of the hermitian symmetric codebook primitive.

22. The non-transitory computer-readable medium of claim 16, wherein the at least one codeword constraint comprises an aliasing distance constraint, wherein the aliasing distance constraint is associated with a distance between two codewords of the hermitian symmetric codebook primitive, and wherein the two codewords are the same.

23. The non-transitory computer-readable medium of claim 16, wherein the at least one codeword constraint comprises a phase shuffling constraint, wherein the phase shuffling constraint is associated with mapping one or more codewords of the hermitian symmetric codebook primitive to spatial symbols.

24. The non-transitory computer-readable medium of claim 16, wherein the at least one codeword constraint comprises a boundary constraint, wherein the boundary constraint is associated with one or more codewords of the hermitian symmetric codebook primitive being recognizable at a boundary region of the hermitian symmetric codebook primitive.

25. An apparatus comprising:
a checking module configured to identify one or more codewords of a bit sequence that fail to satisfy at least one codeword constraint;
a puncturing module configured to remove the one or more codewords from the bit sequence to generate a punctured bit sequence; and
a generation module configured to generate a hermitian symmetric codebook primitive based at least in part on the punctured bit sequence, wherein the hermitian symmetric codebook primitive is useable to form a diffractive optical element.

26. The apparatus of claim 25, wherein the diffractive optical element is manufactured based on an optical pattern using a single-mask photolithographic process.

27. The apparatus of claim 25, wherein hermitian symmetric codebook primitive is configured to form an optical pattern to be generated by the diffractive optical element of a structured light depth sensing system.

28. The apparatus of claim 25, wherein the at least one codeword constraint includes one of a resolution constraint, a spatial representation constraint, a duty cycle of a code word, a contour resolution constraint, an aliasing distance constraint, a spatial basis function constraint, or a code word boundary constraint.

29. An apparatus comprising:
means for identifying one or more codewords of a bit sequence that fail to satisfy at least one codeword constraint;
means for removing the one or more codewords from the bit sequence to generate a punctured bit sequence; and
means for generating a hermitian symmetric codebook primitive based at least in part on the punctured bit sequence, wherein the hermitian symmetric codebook primitive is useable to form a diffractive optical element of a structured light depth sensing system.

30. The apparatus of claim 29, wherein the at least one codeword constraint includes one of a resolution constraint, a spatial representation constraint, a duty cycle of a code word, a contour resolution constraint, an aliasing distance constraint, a spatial basis function constraint or a code word boundary constraint means.

* * * * *